(No Model.)
S. L. TROUPE.
COMBINED CARPET STRETCHER AND TACK DRIVER.
No. 411,270. Patented Sept. 17, 1889.
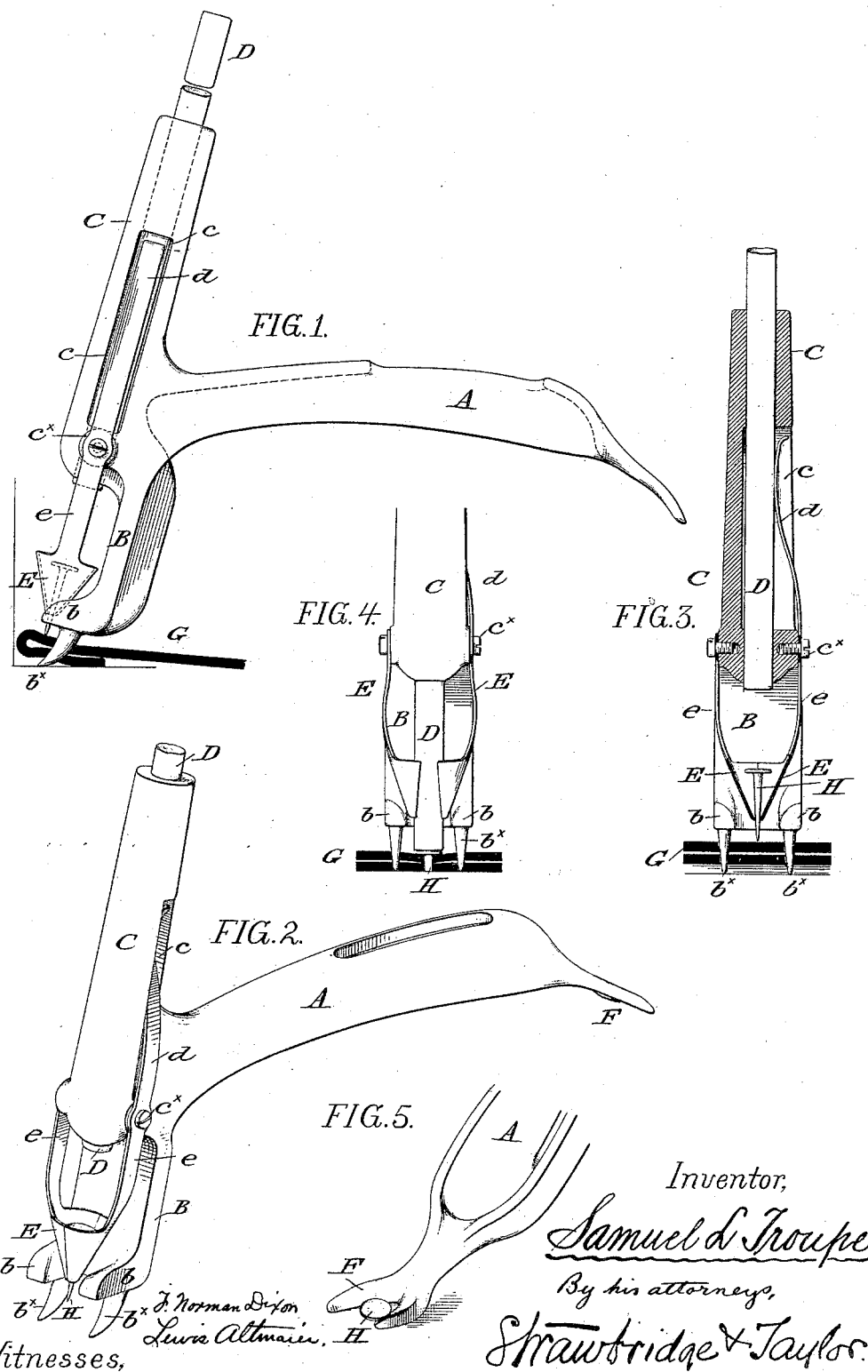

UNITED STATES PATENT OFFICE.

SAMUEL L. TROUPE, OF PHILADELPHIA, PENNSYLVANIA.

COMBINED CARPET-STRETCHER AND TACK-DRIVER.

SPECIFICATION forming part of Letters Patent No. 411,270, dated September 17, 1889.

Application filed May 6, 1889. Serial No. 309,749. (No model.)

*To all whom it may concern:*

Be it known that I, SAMUEL L. TROUPE, a citizen of the United States, residing in the city and county of Philadelphia, and State of Pennsylvania, have invented a combination tool, to wit, a Combined Carpet Stretcher and Tack Driver, of which the following is a specification.

My invention has for its object the union in a single implement of a device for stretching carpet and a device for driving tacks into the carpet when stretched.

To this end my invention comprehends a tool a good form of a convenient embodiment of which is represented in the accompanying drawings and herein described, the particular subject matter claimed as novel being hereinafter definitely specified.

In the accompanying drawings, Figure 1 is a view in a side elevation of a combined carpet stretcher and tack driver embodying my invention. Fig. 2 is a view in perspective of the same device. Fig. 3 is a central elevational view of the said device, the tack-holding jaws and plunger casing being shown in section, and the parts (as also in Figs. 1 and 2) in the position which they occupy before the descent of the plunger for the driving of the tack. Fig. 4 is a fragmentary front elevational view of the shank of the implement and of the lower portion of the plunger casing, the plunger, however, being represented in the position which it occupies when it has descended through the spring jaws and driven home the tack previously contained therein. Fig. 5 is a fragmentary perspective view of the outer end of the lever or handle, showing the tack-drawing device with which said handle is shown as equipped.

Similar letters of reference indicate corresponding parts.

In the drawings, A represents the handle and B the body or shank of the implement. These members preferably occupy an angular position relatively to each other, the angle which, in order to secure the most effectual leverage, I prefer to adopt, being that represented in the drawings, that is to say slightly obtuse or beyond a right angle. The shank of the implement terminates in a pair of presser feet $b\ b$ which extend angularly forward from its lower part and serve to bear down upon and hold flat the carpet G. From beneath these presser feet downwardly project prongs $b^x\ b^x$, to penetrate the carpet and thereby engage it for the purpose of stretching it. The respective presser feet and prongs are spread apart as shown in the drawings.

The shank or body of the implement is continued upwardly above the handle to form a cylindric plunger casing C, the axis of which, although in advance, is yet parallel with that of the shank of the tool, and approximately at right angles to the plane of the bases of the presser feet. Within this casing is contained, free for vertical movement, a plunger D, the same being the hammer that drives the tack H. The plunger as to its exterior conforms to the hollow interior of its casing, and is conveniently maintained therein at any desired elevation by a plunger spring $d$, being, conveniently, a flat spring at its lower end secured to the side of the implement and at its upper end bearing against the plunger through a spring slot $c$ formed in the walls of the casing.

The tack holder device is composed of a pair of spring jaws E E, each, conveniently, in the form of one half of an inverted hollow cone and which are supported upon springs $e\ e$ preferably formed integral with them and which are conveniently secured by screws $c^x$ $c^x$ or kindred contrivances to opposite sides of the shank of the implement in the region where the latter merges into the plunger casing.

The normal set of the spring jaws is that shown in Figs. 2 and 3, in which position a small orifice at their apex permits of the partial passage of the shank of the tack as shown in Figs. 1, 2, and 3. It will be observed that the spring jaws, the shank of the instrument, and its presser feet occupy relatively to the plunger casing such a position that the conical apex of the jaws is in alignment with the axis of the plunger casing and consequently with that of the plunger and disposed centrally between the presser feet,—with the result that when the plunger is forced downward it will enter centrally within the open basal portion of said jaws and encounter the head of the tack in place therein, will, thereafter, in its further descent, force the tack downwardly until its point enters the carpet to be tacked, and still thereafter will spread apart the jaws until it has pushed the tack from out them and itself descended beyond them to an extent necessary to effectuate the complete driving of the tack, all as illustrated in Fig. 4. Upon the ascent of the plunger the jaws under the resilience of their springs will close together again in readiness to receive another tack. It is, of course, to be understood that the descent of the plunger takes place after the instrument has been manipulated to effect the stretching of the carpet, and that, therefore, such descent will effect entrance of the tack into the carpet while in its stretched condition.

I prefer, in the manufacture of the implement, to cast the handle, shank, and plunger casing, as an entirety, lightening and shaping the parts in any preferred manner, but preferably in that represented in the drawings. I also prefer to apply to the outer or free extremity of the handle a claw or other tack-drawing device, which may, however, be omitted.

As an expedient of manufacture I form the plunger spring integral with one of the jaw springs, but, as is obvious, it may be independent thereof. If desired the plunger may be provided with a spiral spring to insure its lift after its descent. The presser feet are not essentials of the invention, and the lower extremity of the shank or body of the implement may, if desired, be formed into prongs or their equivalent without the intermediate formation of the presser feet.

Having thus described my invention, I claim and desire to secure by Letters Patent:

As an article of manufacture, a combined carpet stretcher and tack driver, consisting, essentially, of a shank or body terminating in stretching prongs, a lever or handle angularly projecting rearward from said body, a plunger casing extending in advance of and above said shank or body, whereby a recess is constituted in the front face of the device, a plunger within said casing, a spring for maintaining the plunger elevated within the casing, conically formed tack holding jaws, and spring arms the upper ends of which are attached to the casing and the lower ends to said jaws, whereby the latter are permanently held in proximity to the stretching prongs, with the result that they are, by virtue of the above mentioned recess, accessible from the exterior of the device so that a tack may be placed directly therein, substantially as set forth.

In testimony that I claim the foregoing as my invention I hereunto sign my name this 27th day of April, A. D. 1889.

SAMUEL L. TROUPE.

Witnesses:
F. NORMAN DIXON,
LEWIS ALTMAIER.